Figure 1:
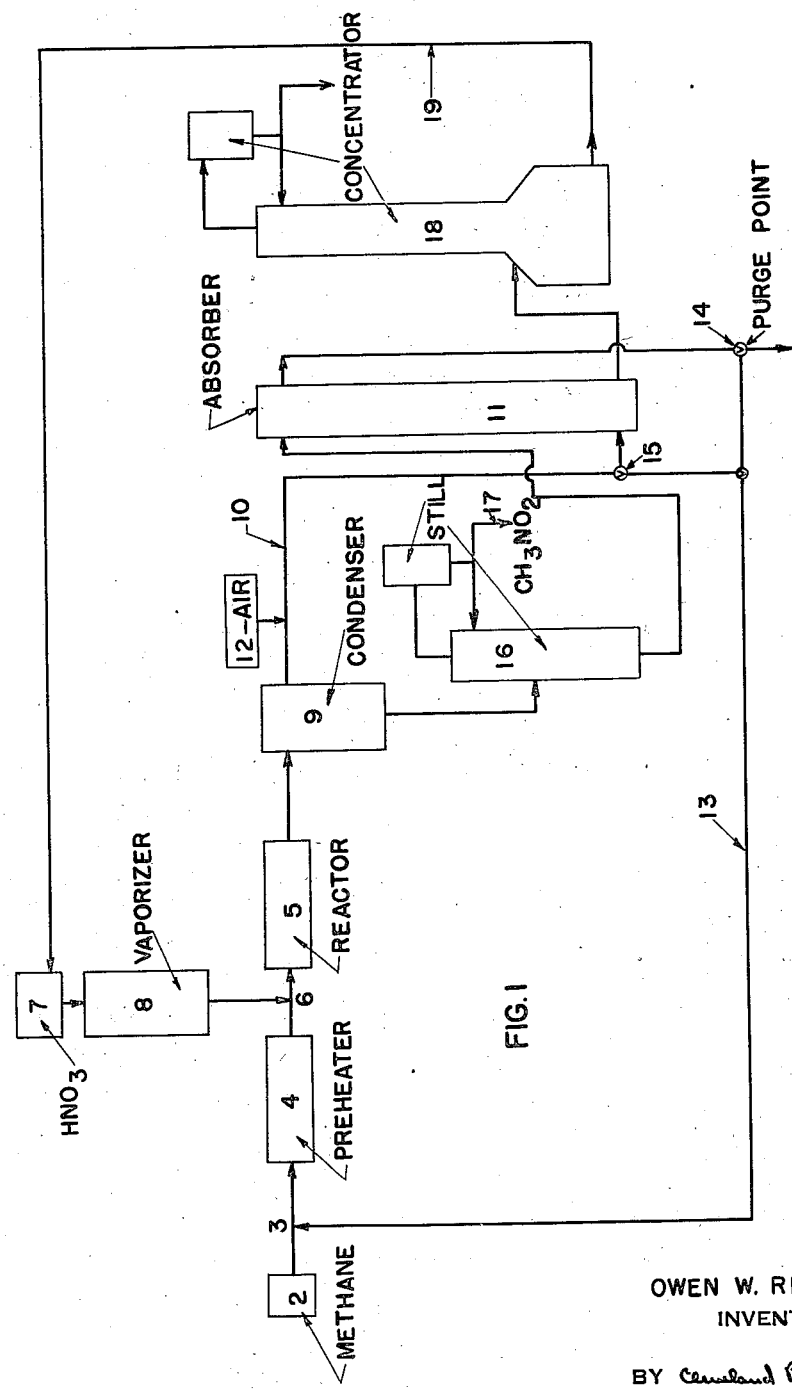

July 28, 1942.　　　O. W. RIDEOUT　　　2,291,345

HYDROCARBON NITRATION

Filed Sept. 10, 1940

OWEN W. RIDEOUT
INVENTOR

BY *Cleveland B. Hollabaugh*

ATTORNEY

Patented July 28, 1942

2,291,345

UNITED STATES PATENT OFFICE 2,291,345

HYDROCARBON NITRATION

Owen W. Rideout, Newark, Del., assignor to Hercules Powder Company, Wilmington, Del., a corporation of Delaware Application September 10, 1940, Serial No. 356,205

3 Claims. (Cl. 260—644)

This invention relates to an improved method for the nitration of methane for formation of nitromethane.

Heretofore, the nitration of methane has not been economically feasible due to the very low yields of nitromethane obtained in respect to the methane introduced into the process. The difficulties attending the reaction of methane and nitric acid, such as low yields of nitromethane and large percentages of methane passing through the reactor without being nitrated have prevented the successful commercial production of nitromethane. A further difficulty in the process has been the lack of successful means of recovering the unreacted methane of the process in order that it might be returned to the nitrator.

It is the object of my invention to produce nitromethane in high ultimate yields with respect to the methane used, while avoiding the necessity for recovering the methane from the processed gas mixture. A further object of this invention is the recovery and reuse of the oxides of nitrogen that do not react with the methane. Other objects will appear hereinafter.

Now in accordance with this invention these objects are accomplished in general by a method of nitration which includes passing an admixture of the gaseous reactants, methane and nitric acid in the vapor phase together with a predetermined quantity of an inert gas through a heated reaction zone in which the reactants are converted to nitromethane.

By the expedient of adding to the gaseous reactants an inert gas the percentage of methane converted to nitromethane during a single pass through the reactor may be greatly increased. Thus by mixing with the methane to be nitrated a suitable quantity of inert gas, such as nitrogen and then passing this diluted admixture, together with the required vaporized nitric acid, through the reactor a yield of nitromethane is obtained which is in excess of that which can be otherwise produced.

The inert gas which is added to the reactants may be nitrogen obtained in any suitable manner but will preferably be nitrogen which is a by-product formed during the recovery of nitrogen oxides which are formed during the nitration procedure.

Thus in accordance with this invention high yields of nitromethane may be obtained upon nitration of an admixture in which the per cent of methane present is controlled by the addition of an inert gas. The nitration is affected by the addition of nitric acid and this addition is coordinated with the total gas entering the reactor. The nitric acid entering the reactor is maintained at a ratio of about 1 mol of nitric acid to 10 mols of the methane-inert gas mixture.

One method of carrying out the reaction and realizing the desired improvement in yield on methane is to mix methane, nitrogen, and aqueous nitric acid, pass through a reaction vessel under conditions described hereafter, condense out nitromethane, nitric acid and water, and recover the nitrogen oxides formed. The following table shows how improved yields of nitromethane based on methane supplied to the reactor are obtained when the methane is diluted with varying proportions of inert gas:

Table I

| Per cent methane in gas entering reactor | 10 | 25 | 35 | 50 | 75 | 100 |
|---|---|---|---|---|---|---|
| Per cent $CH_4$ converted to nitromethane | 6.4 | 5.1 | 4.7 | 3.7 | 3.1 | 2.2 |

The above table shows that the yield based on methane is increased nearly threefold when the methane is diluted with nitrogen until the methane content is reduced to 10%, and correspondingly smaller increases are obtained when less diluted methane is used. The amount of methane present is preferably from 5% to 15% by volume based on the total gas entering the reactor and should not substantially exceed 35% for best results.

It is possible in accordance with this invention to increase the yield still further by a proper choice of the source of inert gas used for dilution. Thus gases from the nitration of methane, after condensation of nitromethane and unreacted nitric acid, contain unreacted methane, nitrogen and nitrogen oxides. These gases are now mixed with a small excess of air and the nitric oxide converted to nitric acid by multiple countercurrent contact with water in the known manner. The gas leaving the absorption system consists mainly of nitrogen and methane. This inert gas and methane is used to dilute a quantity of new methane. It will carry with it a quantity of methane which will reduce the amount of new methane required to make a mixture containing a desired percentage of methane.

It is readily seen that the process described may be a cyclical process provided that any excess of gas in the system is removed by bleeding out a portion of the gas after leaving the nitric acid absorber, and before enriching with new methane.

An alternative process, and one which would give a still higher proportion of methane converted to nitromethane, involves the use of oxygen instead of air to oxidize the nitric oxide to nitric acid. This alternative process avoids introduction of a large excess of nitrogen in the air and thereby provides a gas richer in methane with the result that less new methane is required to provide a starting gas of the desired content.

In accordance with this invention a greater proportion of the methane supplied to the reactor is converted to nitromethane if the methane is first diluted with an inert gas. Further the use of any mixture of methane with a substantial quantity of inert gas lies within the scope of the invention. Such a mixture of methane and inert gas will normally be supplied at first by admixing pure nitrogen and pure methane but this admixture of gas might, for example, be obtained as a by-product of the partial oxidation of methane to formaldehyde by known methods.

The variables of this process that should be coordinated to obtain optimum operating conditions include the pressure, temperature, and time of reaction, the design of the reaction vessel, and the composition of the gases entering the reactor.

The reaction vessel may be of any material which will withstand the necessary temperature and the corrosive action of the reactants and reaction products but I have found it desirable, although not essential, to use for the parts which come into contact with the reactants at elevated temperatures a material other than a ferrous metal. For example, a stainless steel surface in the reaction chamber tends to lower the proportion of the nitric acid converted into nitromethane, probably by catalyzing the thermal decomposition of nitromethane. Thus, the stainless steel surface appears to have a negative catalytic effect on the reaction. Suitable materials for the construction of the reaction vessel, which have substantially no negative catalytic effect on the reaction and which are not substantially corroded by the reactants and reaction products are, for example, glass, glass-lined vessels, fused silica, fused silica-lined vessels, gold-lined vessels, etc.

The design of the reaction vessel will provide for a means of controlling the temperature, such as by a surrounding bath, but the reactor must be of such proportions and design that the temperature within the reaction chamber may be controlled accurately. This temperature of reaction has a direct bearing on the yields obtained; for example, when the reaction vessel is a long, narrow tube immersed in a molten salt bath maintained at the desired reaction temperature entirely satisfactory control is obtained, but however, the long, narrow tube has the disadvantage of a high ratio of surface area to volume, which magnifies any catalytic effect the material of construction might exhibit. Thus, a stainless steel tube of small diameter may negatively catalyze the reaction to such an extent that only traces of nitromethane may be obtained. If the reaction vessel is made shorter and of larger diameter, the negative catalytic effect of the construction material is minimized, but temperature control suffers because the available surface is not large enough to remove the heat of reaction when the temperature in the reaction vessel rises, which causes decomposition of the nitromethane if the temperature rise is excessive. I have found however that temperature control can be maintained even in the short and larger diameter vessels, if part of the reactants are led into the vessel at a point between the entrance where the preheated reactants are introduced and the exit where the products of reaction leave. This part of the reactants is led in at a temperature below the reaction temperature in such quantity that excessive temperature rise in the reaction chamber is prevented.

If desired the reaction may be carried out at elevated pressures, for example, within the range of from atmospheric pressure to about 800 pounds gauge pressure so that the apparatus may be smaller for a given output and so that the products of the reaction can be condensed out without the use of refrigeration or scrubbing with water. Although I have found that my process gives satisfactory results at elevated pressures, I prefer to use about 100 pounds gauge pressure in order to effect easy condensation of the nitromethane and in order to provide an efficient absorption unit for recovery of the nitric acid.

Since the reaction temperature of the gases is preferably about 460° to about 480° C., I have preheated the methane-recirculated gas mixture in a preheater to such a temperature usually about 500° C. to about 700° C. that the reaction vessel and reactants are maintained constantly within the desired temperature range. As has been described hereinbefore to facilitate temperature control of the reaction I may introduce the reactants into the reactor at various points and at any desired temperatures.

I have found that to obtain high yields of nitromethane, the temperature of the process, which is the actual temperature at which the reactants are maintained within the reactor and the actual temperature of the reactor itself, should both be maintained within the range of about 375° C. to about 550° C. and preferably within the range of about 460° C. to 480° C.

The contact time of the reactants within the reactor in conjunction with the temperature of the reaction varies the yields of nitromethane obtained. I have found that good yields may be obtained when using a contact time within the range of about 1.0 second at about 375° C. to about 0.005 second at about 550° C. but that the highest yields of nitromethane are obtained when a preferable contact time of about 0.29 second to about 0.31 second with a reaction temperature of about 460° C. to about 480° C. is used.

The strength of the nitric acid used in the process does not exhibit a marked effect on the yields of nitromethane obtained. Nitric acid of about 35% to about 68% strength has been found satisfactory for use in the process but the preferable strength for my process is about 40%. I have found that although the nitric acid strength is not controlling I obtain better yields of nitromethane if I maintain a mol ratio of about 1 to 6 to about 1 to 15 between the nitric acid and the gases entering the reactor. A preferable mol ratio between the nitric acid and the methane-recirculated gas mixture entering the reactor is about 1 to 10 and this mol ratio has been maintained through most nitration runs in this invention. Expressed in terms of percentage by volume the desirable range is about 6% to about 14% nitric acid based on the total volume of gas entering the reactor and preferably about 9%.

A suitable method for producing nitromethane in accordance with my invention may be a continuous process such as is diagrammatically represented by the flow sheet shown in Figure 1 in which methane 2 is mixed with recirculated gases at 3; then said mixture is led into a preheater 4 from which the mixture goes to the reactor 5. The addition of nitric acid vapors at 6 is necessary to the process and is accomplished by vaporizing nitric acid from tank 7 in vaporizer 8. The reaction carried out in reactor 5 produces nitromethane in admixture with nitrogen oxides, nitric acid, methane, carbon monoxide, carbon dioxide, and nitrogen therefore necessitating the separating of the nitromethane from said gases. Separation is accomplished by passing these products into a condenser 9 which removes the nitromethane and nitric acid but allows the remaining gases to proceed via valved pipe 10 to the bottom of absorber 11. The gases from condenser 9 are mixed with air at point 12 which furnishes the oxygen necessary to oxidize the nitrogen oxide present to nitric acid in the presence of water. The processed gas-air mixture is introduced into the bottom of absorber 11 which removes the nitric oxides from the gases. The remaining gases are then led via valved pipe line 13 back to point 3. In pipe line 13 are means of purging 14 the gases from absorber 11 to control the amount of recirculated gases in order to insure that the optimum composition of gas entering preheater 4 is maintained. Referring back to the nitromethane and nitric acid removed by condenser 9; these two compounds are separated from each other by distillation in still 16 producing pure nitromethane at point 17 and allowing the nitric acid to be led to the top of absorber 11 where after being used as an absorbent it is drawn from the bottom of the absorber 11 and led to an acid concentrator 18. Concentrator 18 produces nitric acid of the proper strength to be returned to acid tank 7, via pipe line 19, for use in the process.

The hereinbefore described process of Figure 1 indicates that the processed gases after being treated with air at 12 are led through absorber 11 and then recirculated to point 3 of the system, thereby effecting oxidation of nitrogen oxide, absorption of nitric oxides, and recirculation of the gases. Now an alternative method of recirculation, in accordance with my invention, may include the return of the processed gases, after the addition of air and before the processed gas-air mixture enters the absorber, to point 3 via valve pipe line 10 and 13 from which point the said gases are recirculated throughout the system. The recovery of the nitric oxides and purging of the processed gas-air mixture are accomplished by bleeding the system at valve 15, the gases so bled enter the absorber wherein the nitric oxides are recovered. The unabsorbed gases, comprising a mixture of methane, nitrogen, carbon dioxide, etc., are exhausted at purge point 14 to waste.

The need of the purging or bleeding processes used in accordance with my invention arises from the constantly increasing percentage of inert gases introduced into the process by the breakdown of the methane into carbon monoxide and carbon dioxide and by the introduction of air into the system. I have found it preferable to constantly purge a portion of the processed gases but I may if desirable purge the system intermittently.

The above processes may be continuous and they produce nitromethane in very high ultimate yields based on the total amount of methane added to the process.

It will be understood that the details and examples hereinbefore set forth are illustrative only and that the invention as broadly described and claimed is in no way limited thereby.

This application is a continuation-in-part of my application Serial No. 259,425 filed March 2, 1939.

What I claim and desire to protect by Letters Patent is:

1. In a process for the nitration of methane by contacting methane and nitric acid vapor in the vapor phase under conditions of time and temperature adapted to effect efficient reaction, said conditions being between about 1 second at about 375° C. and about .005 second at about 550° C., the step of maintaining within the reaction zone a gaseous mixture which consists essentially of nitric acid vapor, inert gas, and methane, said nitric acid vapor being present in the range of about 6% to about 14% by volume of the total gas, and said methane being present in an amount not greater than about 35% by volume of the total gas.

2. In a process for the nitration of methane by contacting methane and nitric acid vapor in the vapor phase under conditions of time and temperature adapted to effect efficient reaction, said conditions being between about 1 second at about 375° C. and about .005 second at about 550° C., the step of maintaining within the reaction zone a gaseous mixture which consists essentially of nitric acid vapor, methane, and an inert gas, said nitric acid vapor being present in the range of about 6% to about 14% by volume of the total gas, and methane being present in the range of about 5% to about 15% by volume of the total gas.

3. In a process for the nitration of methane by contacting methane and nitric acid vapor in the vapor phase under conditions of time and temperature adapted to effect efficient reaction, said conditions being between about 1 second at about 375° C. and about .005 second at about 550° C., the step of maintaining within the reaction zone a gaseous mixture which consists essentially of methane, nitric acid vapor, and an inert gas, said nitric acid vapor being present in the amount of about 9% by volume of the total gas and the methane being present in an amount less than 35% by volume of the total gas.

OWEN W. RIDEOUT.